Figure 1:
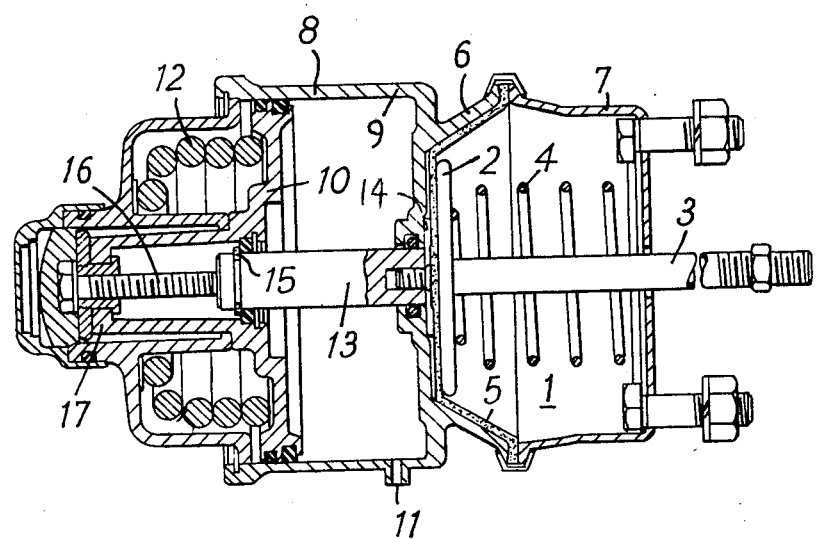

United States Patent [19]
Gibbons

[11] 3,911,795
[45] Oct. 14, 1975

[54] PISTON AND CYLINDER APPARATUS

[75] Inventor: Peter Frederick Gibbons, Bristol, England

[73] Assignee: Bendix Westinghouse Limited, Bristol, England

[22] Filed: Nov. 20, 1973

[21] Appl. No.: 417,618

[30] Foreign Application Priority Data
Dec. 9, 1972 United Kingdom............ 56939/72

[52] U.S. Cl. .................. 92/63; 92/159; 92/249
[51] Int. Cl.² ................. F01B 7/00; F16J 9/00
[58] Field of Search ....... 92/63, 155, 288, 289, 250, 92/251, 252, 253, 240; 277/226, 34.3, 34.6

[56] References Cited
UNITED STATES PATENTS

| | | |
|---|---|---|
| 1,846,046 | 2/1932 | Bennett.................................. 92/251 |
| 2,447,340 | 8/1948 | Jackson................................ 277/22 C |
| 3,107,583 | 10/1963 | Woodward................................ 92/63 |
| 3,125,346 | 3/1964 | Poltorak................................ 277/34 |
| 3,155,015 | 11/1964 | Genz...................................... 92/249 |
| 3,212,408 | 10/1965 | Randol................................. 277/34 |

Primary Examiner—Paul E. Maslousky
Attorney, Agent, or Firm—Larson, Taylor & Hinds

[57] ABSTRACT

A spacer ring for a piston and cylinder apparatus is formed of a tube of polyamide material which is retained in a groove around the piston and resiliently deforms to the size of the cylinder bore. The use of such a tubular ring of polyamide has the effect of producing a high quality finish within the bore of a metal cylinder.

5 Claims, 2 Drawing Figures

U.S. Patent    Oct. 14, 1975    3,911,795

PISTON AND CYLINDER APPARATUS

This invention relates to piston and cylinder apparatus.

According to the present invention there is provided a piston and cylinder apparatus including a piston slidable within a cylinder, the piston being provided with a circumferential retaining means and retained thereby a piston spacing ring which is of tubular section and resiliently deformable when engaged between the piston and cylinder to adapt to the dimensions of the cylinder bore.

A more specific aspect of the invention comprises a spring brake actuator for vehicle brakes in which a brake is applied by the force of a spring, release being afforded by a fluid pressure responsive piston in a cylinder, the piston being provided with a circumferential retaining means and retained thereby a piston spacing ring which is of tubular section and resiliently deformable when engaged between the piston and cylinder bore to adapt to the dimensions of the cylinder bore.

The piston spacing ring is preferably of a material of different molecular structure to that of the bore of the cylinder. The preferred material is a super polyamide (better known as "nylon") but other material having similar relevant physical properties of resilience and resistance to wear in contact with metal surfaces are suitable. Such materials include acetals, polyolefines and polytetrafluorethylenes.

Figure 2:
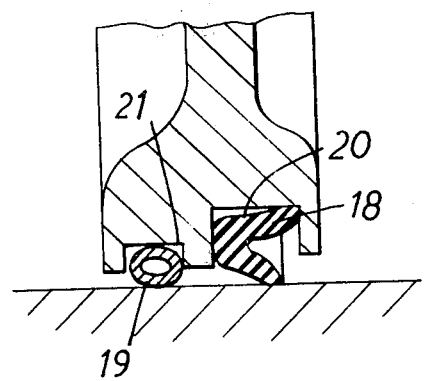

In order that the invention may be more clearly understood and readily carried into effect, the same will further be described by way of example with reference to the accompanying drawings of which:

FIG. 1 illustrates a vehicle brake actuator embodying one aspect of the invention and FIG. 2 illustrates on enlarged scale a part of a cylinder and piston of the actuator of FIG. 1.

Referring to FIG. 1, this shows a combined air brake actuator and spring brake actuator. The pneumatic brake cylinder 1 is of conventional construction and includes a pressure responsive member in the form of a diaphragm 5 and follower 2 mounted on a brake actuating shaft 3. Between the follower 2 and the housing there is provided a spring 4 which urges the follower and pressure responsive member to the leftmost position of the actuator as shown. The diaphragm 5 is clamped between the two halves 6 and 7 of the housing of the pneumatic actuator.

The portion 6 of the housing of the pneumatic actuator is provided with an extension portion 8 which comprises a cylinder having a bore 9 within which a piston 10 is slidable. The cylinder is provided with a port 11 for the application of fluid pressure to the right hand side of the cylinder and such pressure has the effect of deflecting the piston leftwards to comprise a heavy spring which is denoted by reference 12. The spring 12 is of sufficient strength to engage the brake in the absence of fluid pressure in the cylinder. The piston 10 is provided with a central aperture within which there is sealingly slidable a rod 13 which is also sealingly slidable substantially co-axially with the shaft 13 and engageable through the housing 6 with the above mentioned pressure responsive member of the pneumatic actuator. An end pad 14 on the shaft 13 serves as a pressure pad on the one hand and as a stop to prevent the shaft 13 travelling further than the extreme position shown in the drawing under the influence of pressure in the cylinder. The left hand end of the shaft 13 is provided with a circlip 15 for retaining the shaft within the piston. A screw denoted by the reference 16 is fitted to the outer-most end of a trunk 17 forming part of the piston 10 and is adjustable from outside to enable the piston 10 to move to the right along the shaft 13 in the event of manual release of the thrust of the spring being required, for example on failure of a fluid pressure supply at the port 11.

An actuator of the general type described above, is described in the Specification of British Pat. No. 956,195 which describes and claims an attachment for a conventional brake cylinder.

By virtue of the present invention, the piston 10 which is slidable within the cylinder 9, is provided not only with a first piston sealing ring 18 and a second piston spacing ring 19, but the spacing piston ring 19 is formed surprisingly and advantageously of a tubular cross section. This tubular cross section being formed preferably of super polyamide ("nylon") such as to be deformable when engaged between the piston 10 and the cylinder 9 and thus adapts to the dimensions of the cylinder. Retaining means for the piston rings comprise grooves 20 and 21, the groove 21 being such that when the piston spacing ring 19 of tubular cross section is deformed by insertion of the piston within the cylinder, the ring 19 is expanded towards the sides of the groove to enable little or no movement to exist between the piston spacing ring 19 and the groove 21 which retains it in operation.

Advantages of hollow section super-polyamide tube for the piston spacing ring 19 as described above have been found to exist. These advantages include firstly, that a semirigid low friction guide not requiring close dimensional tolerances of the piston ring or the groove which retains it, is provided. Secondly, such a greater durability and adaptability to wear in operation can result that the fluid seal which is provided by the piston sealing ring 18, is more efficiently protected against side loads and the ingress of foreign matter than has hitherto been possible. Thirdly, the manufactured initial cylinder bore finish can be less critical by the use of a material such as specified above, in that it polishes the bore in operation and due to the slightly resilient form of the tubular section of 19, the piston spacing ring 19 is slowly adaptable to wear within the cylinder. Finally, by virtue of the close adaptable fit of the tubular piston ring in the bore, lubricant can be more efficiently retained between the piston spacing ring 19 and the fluid seal which is afforded by the piston sealing ring 18.

Whilst the invention has been described in the foregoing in particular relationship to a spring-brake actuator, the invention is by no means limited to such an actuator and may readily find application in other devices employing a piston and cylinder. Further, whilst in the example described above, one piston spring ring is provided "behind" the piston sealing ring, this and other applications of the invention may have the piston spacing ring in front of the sealing ring. Again, such a piston spacing ring may be provided both in front of and behind the sealing ring.

Having thus described our invention what we claim is:

1. A piston and cylinder actuator comprising a piston slidable within a cylinder, piston sealing ring means carried by the piston for sealing between the piston and the cylinder to prevent passage of fluid from one side of the piston to the other when there is a difference of pressure across the piston, circumferential retaining means formed in the piston circumference, and piston spacing means carried by said circumferential retaining means and bearing against the cylinder wall for guiding and centralizing the piston in the cylinder and protecting said sealing ring against side loads on the piston, said piston spacing means comprising a piston spacing ring of synthetic polymeric material and which is of generally tubular section with a hollow interior and itself resiliently deformable when engaged between and contacting the piston and cylinder to adapt to the dimensions of the bore of the cylinder.

2. Apparatus as claimed in claim 1 wherein said tubular piston spacing ring is of a super-polyamide material.

3. Apparatus as claimed in claim 2 wherein said piston and cylinder apparatus is a spring-pneumatic actuator for a brake, having a brake applying spring bearing against the piston to actuate it in one direction, and a pneumatic pressure source to selectively counteract the thrust of the spring.

4. Apparatus as claimed in claim 3 wherein the spring is a compression spring bearing against one face of the piston, and said pneumatic pressure acts on the opposite face, and wherein said piston sealing ring is toward said opposite face relative to said tubular spacing ring.

5. Apparatus as claimed in claim 4 wherein said circumferential retaining means comprises a groove in the wall of the piston, the groove dimensions being such that when said tubular piston spacing ring is deformed by insertion of the piston within the cylinder, the tubular spacing ring is expanded toward the sides of the groove such that there can be substantially no movement between the tubular spacing ring and its retaining groove.

* * * * *